United States Patent [19]

Foreman et al.

[11] Patent Number: 5,181,859

[45] Date of Patent: Jan. 26, 1993

[54] ELECTRICAL CONNECTOR CIRCUIT WAFER

[75] Inventors: Kevin G. Foreman, Sandia Park; Paul J. Miller, Placitas, both of N. Mex.

[73] Assignee: TRW Inc., Redondo Beach, Calif.

[21] Appl. No.: 895,148

[22] Filed: Jun. 5, 1992

Related U.S. Application Data

[63] Continuation of Ser. No. 694,262, Apr. 29, 1991, abandoned.

[51] Int. Cl.⁵ .............................................. H01R 13/02
[52] U.S. Cl. ................................. 439/225; 361/405; 439/890
[58] Field of Search ................................... 439/43–45, 439/49, 54, 65, 75, 225, 621, 890, 927; 361/405

[56] References Cited

U.S. PATENT DOCUMENTS

| | | | |
|---|---|---|---|
| T947,007 | 6/1975 | Krumreich et al. . | |
| 2,073,880 | 3/1937 | Robinson . | |
| 2,760,128 | 8/1956 | Colby . | |
| 2,944,330 | 7/1960 | Swick . | |
| 3,072,873 | 1/1963 | Traher . | |
| 3,500,194 | 3/1970 | Smith . | |
| 3,569,915 | 3/1971 | Langham et al. . | |
| 3,670,292 | 6/1972 | Tracy . | |
| 3,736,379 | 5/1973 | Kagan . | |
| 3,753,261 | 8/1973 | Thaxton . | |
| 3,825,874 | 7/1974 | Peverill . | |
| 3,852,700 | 12/1974 | Haws . | |
| 3,905,013 | 9/1975 | Lee . | |
| 4,002,397 | 1/1977 | Wang et al. . | |
| 4,056,299 | 11/1977 | Paige . | |
| 4,082,394 | 4/1978 | Gedney et al. | 361/405 |
| 4,326,765 | 4/1982 | Brancaleone . | |
| 4,362,350 | 12/1982 | von Harz . | |
| 4,407,552 | 10/1983 | Watanabe et al. . | |
| 4,415,218 | 11/1983 | McKenzie | 439/890 |
| 4,440,463 | 4/1984 | Gliha, Jr. et al. . | |
| 4,673,237 | 6/1987 | Wadsworth . | |
| 4,676,564 | 6/1987 | Mitchell, Jr. | 439/225 |
| 4,717,349 | 1/1988 | Johnson . | |
| 4,820,174 | 4/1989 | Farrar et al. . | |
| 4,846,705 | 7/1989 | Brunnenmeyer . | |
| 4,979,070 | 12/1990 | Bodkin . | |
| 4,979,904 | 12/1990 | Francis . | |
| 5,092,788 | 3/1992 | Pristupa, Jr. et al. . | |
| 5,118,302 | 6/1992 | Fussell et al. . | |
| 5,134,252 | 7/1992 | Himeno et al. . | |

*Primary Examiner*—Paula A. Bradley
*Attorney, Agent, or Firm*—G. Gregory Schivley; Robert W. Keller

[57] ABSTRACT

A semiconductor wafer has a plurality of holes therein which correspond to pins of an electrical connector. The wafer includes circuitry thereon and contacts for making electrical connection to the pins. In such manner, the circuitry on the wafer can be used for a wide variety of purposes such as testing or modifying signals carried by the pins. The wafer can be installed in any common electrical connector pair without prior modification or preparation of the connectors and without impairing the normal fit or function of the mated connector pair.

34 Claims, 6 Drawing Sheets

ELECTRICAL CONNECTOR CIRCUIT WAFER

This application is a continuation of application Ser. No. 07/694,262, filed Apr. 29, 1991, now abandoned.

BACKGROUND OF THE INVENTION

1. Technical Field

This invention relates to electronic components and, more particularly, to a device for making electrical connection to a plurality of pins in a male connector.

2. Discussion

Electrical connections and cables are used in a variety of applications to transmit electrical signals from different sources to an equally wide variety of destinations. The cables generally include a plurality of individual wires which terminate at one end in either a male connector or a female connector. The male connector typically employs a series of pins which are housed in a generally cylindrical or rectangular shell that mate with sockets in the female connector.

It sometimes becomes necessary or desirable to obtain access to the electrical signals carried by each of the individual cable wires. For example, it may be desirable to detect the peak level of electromagnetic pulse induced stress on all of the pins. In the past, a complex array of passive and active instrumentation components was required to perform such tests. Much of the complexity is due to the fact that there is no convenient way to obtain access to the signals carried by the individual wires in the cable.

It is also envisioned that there exists a need to provide a relatively simple, yet reliable technique for easily coupling electrical circuits to the pins in such connectors. The electrical circuits could consist of active or passive electronic components, as well as more sophisticated microprocessors. Despite this need, it does not appear that the prior art has proposed an eloquently simple solution to the problem in the manner suggested by the present invention.

SUMMARY OF THE INVENTION

In accordance with the teachings of the present invention, a wafer, preferably of semiconductor material, is provided that has a series of holes in it that are aligned with the pins in the male connector. The wafer is inserted into the male connector so that the pins pass through the holes in the wafer. The wafer contains any of a wide variety of circuit means for performing preselected functions associated with the signals on the pins. These circuit means can include passive or active electronic components, or the aforementioned microprocessor circuits which are easily implemented in integrated circuit form on the wafer. The wafer further includes contact means for making electrical contact between the pins as they extend through the holes in the wafer and the circuit means. In such manner, electrical connection between the desired circuit and the pins in the connector is easily and rapidly made, without requiring advance preparations of the host connector pair. As will appear, the present invention has a wide variety of applications.

BRIEF DESCRIPTION OF THE DRAWINGS

The various advantages of the present invention will become apparent to those skilled in the art after a study of the specification and by reference to the drawings in which:

FIG. 1(A and B) is an exploded perspective view showing the installation of a wafer made in accordance with the teachings of the preferred embodiment of this invention;

FIG. 6(A and B) is a plan view illustrating one particular circuit design for the wafer;

DESCRIPTION OF THE PREFERRED EMBODIMENTS

Figure 1A:
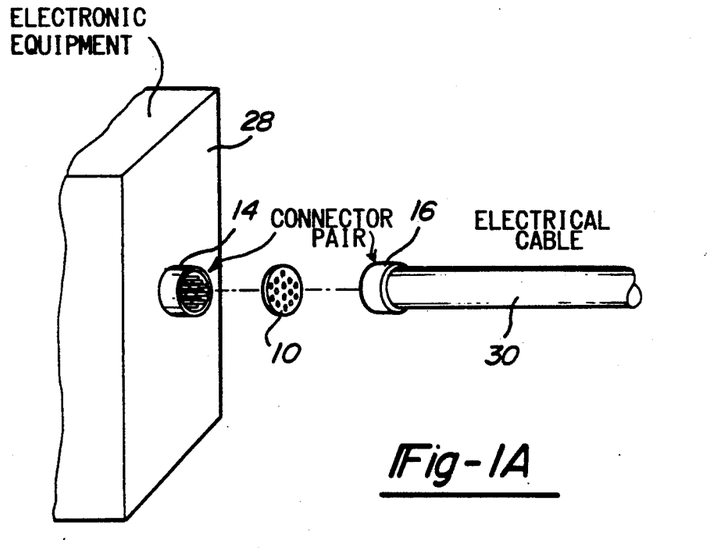
Figure 1B:
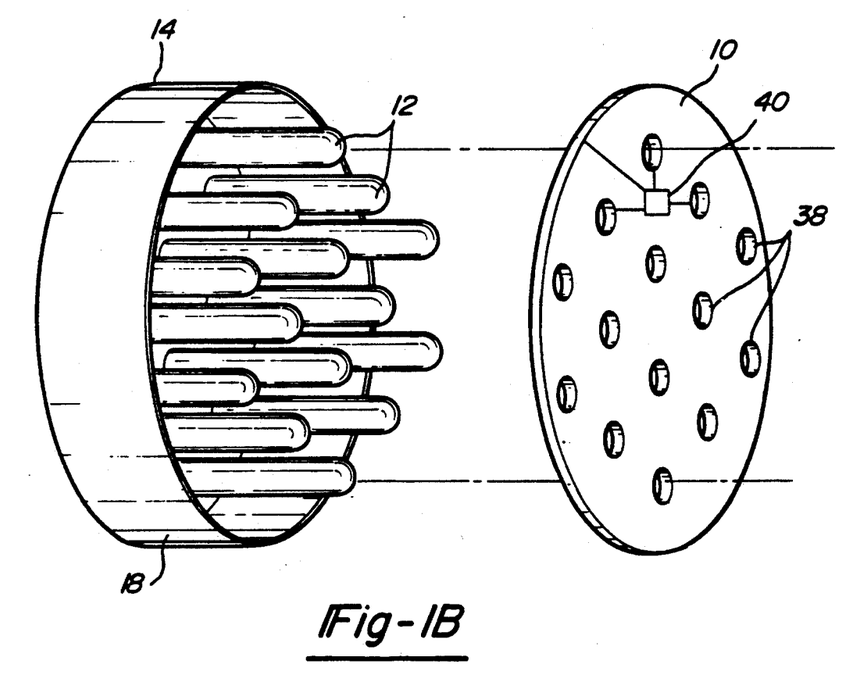

It should be understood from the outset that the present invention will be described in connection with a few limited examples which illustrate the best mode of practicing the invention at the time that this application was filed. However, various modifications will become apparent to those skilled in the art after having the benefit of studying the text, drawings and claims which follow this detailed specification. With that caveat in mind, the attention of the reader should now be turned to the drawings, especially FIG. 1.

In accordance with the preferred teachings of this invention, a wafer 10 is provided for making electrical connection to the pins 12 of a male electrical connector 14. Male electrical connector 14 mates with a female connector 16 in a manner well known in the art. By way of a specific, although not limiting example, and as shown in more detail in FIGS. 2-3, the male/female connectors 14 and 16 are of the type meeting military specification (C-38999). The male connector is characterized by a cylindrical metal outer shell 18 which is removably connected to a complementary metal shell 20 on the female connector 16. The removable connection is usually made by a bayonet coupling on the mating surfaces of the shells 18 and 20, although other such connections can also be made to ensure proper mating of the connectors.

The interior of the male connector includes a nonconductive insert 22 that maintains the orientation of the pins 12 and insulates them from the conductive shell 18. The female connector 16 likewise includes a nonconductive insert 24 and an array of sockets 26 for receiving the pins 12.

The male connector is shown in FIG. 1 as being coupled to electronic equipment 28. The female connector 16 is mounted on one end of an electrical cable 30. The cable contains a plurality of wires that carry electrical signals to and from the electronic equipment 28 when the connectors 14 and 16 are mated together.

In accordance with the teachings of this invention, the wafer 10 is inserted between the mated connectors 14 and 16. The wafer 10 has a diameter smaller than the inner diameter of the smallest connector shell and is thin enough to be inserted between the connector pair without interfering with the positive connection therebetween. As shown perhaps best in FIG. 3, wafer 10 includes two generally parallel major surfaces 32 and 34, along with a peripheral edge 36. A series of holes 38 are formed between the two major faces of the wafer. Holes 38 are aligned with and slightly larger than the diameter of pins 12.

Circuitry, generally designated by the numeral 40, is formed on the wafer 10 and is in electrical contact with one or more of the pins 12. The circuitry 40 can be any of a wide variety of devices such as active and passive electronic components, as well as more sophisticated microprocessing circuitry. The circuitry 40 is generally designed to perform preselected functions associated with the electrical signals on the pins 12. These functions include, but are not limited to, radio frequency instrumentation, signal rerouting and interface protection using passive electronic components such as current/voltage monitors, transient limiters and point-to-point wiring. Active electronics such as analog and logic circuitry, matrix switches, power management devices and temperature/shock sensors can be utilized to provide discrete event monitoring, integrated built-in test augmentation and diagnostics, signal processing, interface diagnostics and/or signal conditioning. Circuitry 40, on the other hand, may take the form of microprocessing circuitry such as the 68000 variety, and may include static RAM and ROM as well as nonvolatile memory. In that event, the circuitry can provide discrete event recordation and decision based signal conditioning/diagnostics.

Figure 6A:
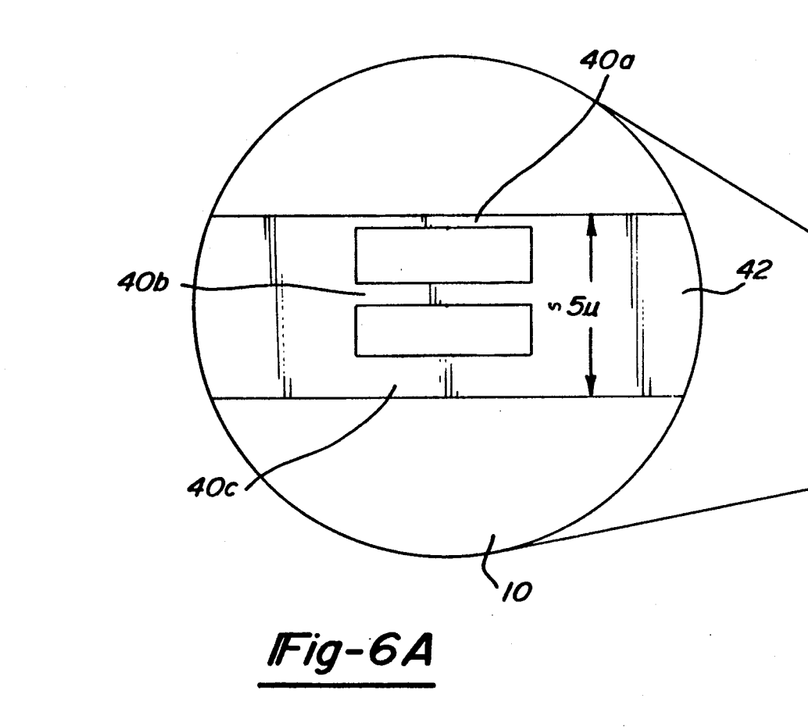
Figure 6B:
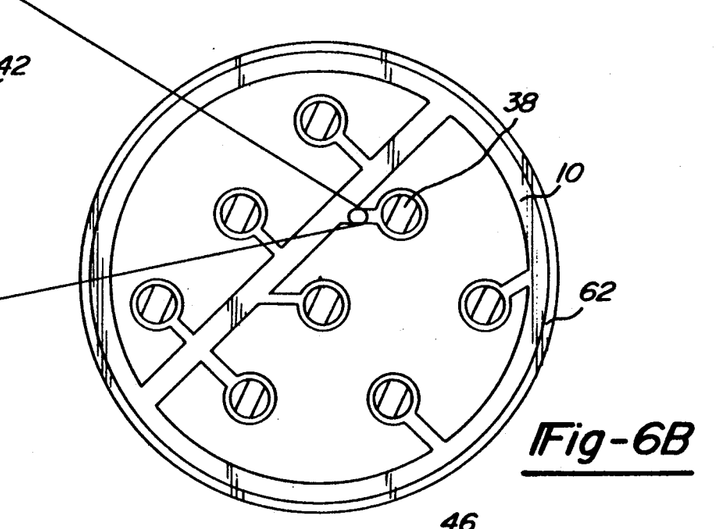
Figure 7:
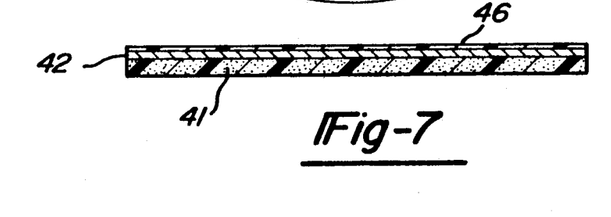
FIG. 7 is a side view of the wafer of FIG. 6.

Circuitry 40 is shown in FIG. 6, however, as consisting simply of a plurality of fuses 40(a, b, and c) which are formed by areas of reduced widths in a thin film metal layer 42 formed on surface 32 of wafer 10. The fuses 40(a, b and c) are connected to the pins and operate, in this example, to sense electromagnetic pulse induced stress on the pins 12. If, for example, a potentially damaging pulse is received exceeding a predetermined current level then one or more of the fuses will melt causing a change in resistance associated with that pin. The wafer, in this example, takes the form of a silicon substrate 41 and includes a passivation layer 46, as shown in FIG. 7. Instead of the circuitry 40 being a simple metal fuse formed on the wafer surface, conventional very large scale integration circuit techniques can be used to form active devices within the body of the semiconductor wafer.

Figure 4:
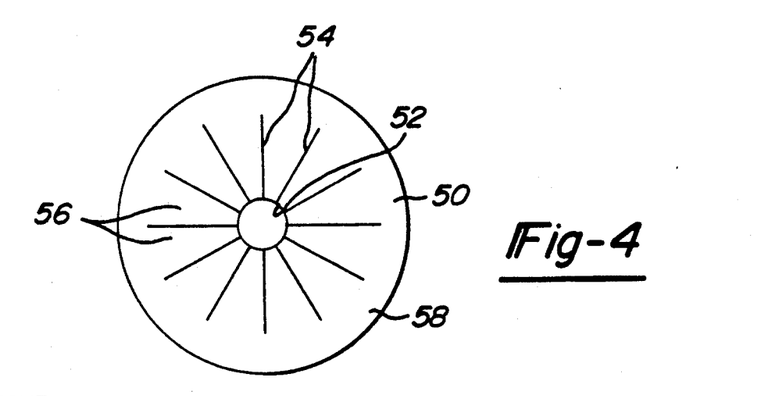
FIG. 4 is a plan view of a suitable contact configuration.
Figure 5:
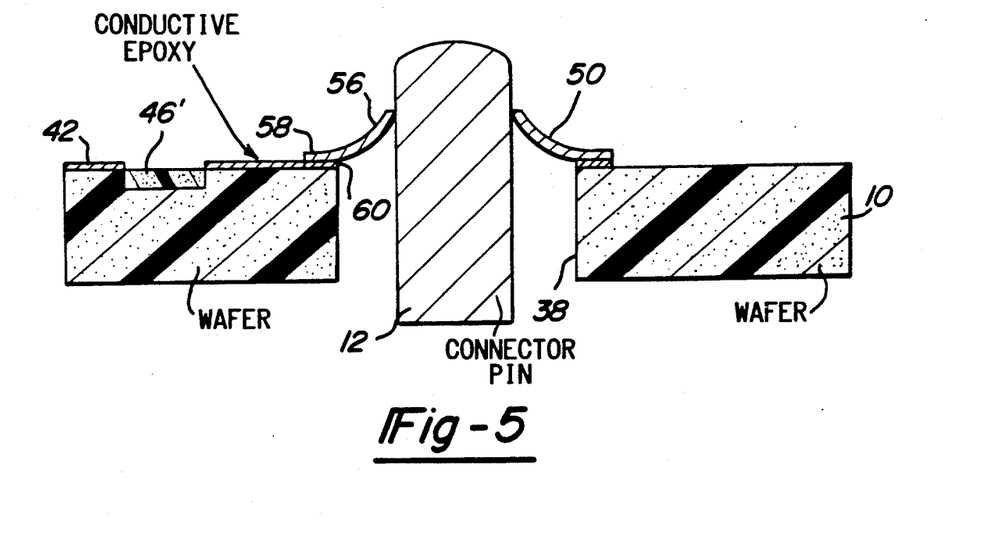
FIG. 5 is a partial side view showing the contact design in use.

In any event, some type of electrical connection is also provided between the pins 12 and the circuitry 40. In this particular example, a metallic disc 50 is provided for each wafer hole 38. As shown best in FIGS. 3-5, each metallic disc 50 includes an aperture 52 whose diameter is slightly smaller than the cross sectional diameter of the connector pin 12. A plurality of radially extending slits 54 define an array of bendable fingers 56, the inner portions of which serve to bend under the force of the connector pin being inserted through the wafer holes 38 to thereby make a sliding, removable, yet positive electrical connection with each pin. The non-slitted peripheral rim 58 of the disc 50 is mounted by way of conductive epoxy or solder to conductive circular pads 60 on wafer 10 surrounding holes 38. The discs 50 are connected by way of metal traces 42 to the circuitry which, in FIG. 5, bears the reference numeral 40' to represent an active electronic integrated circuit component formed in the surface of semiconductor material serving as wafer 10.

Figure 3:
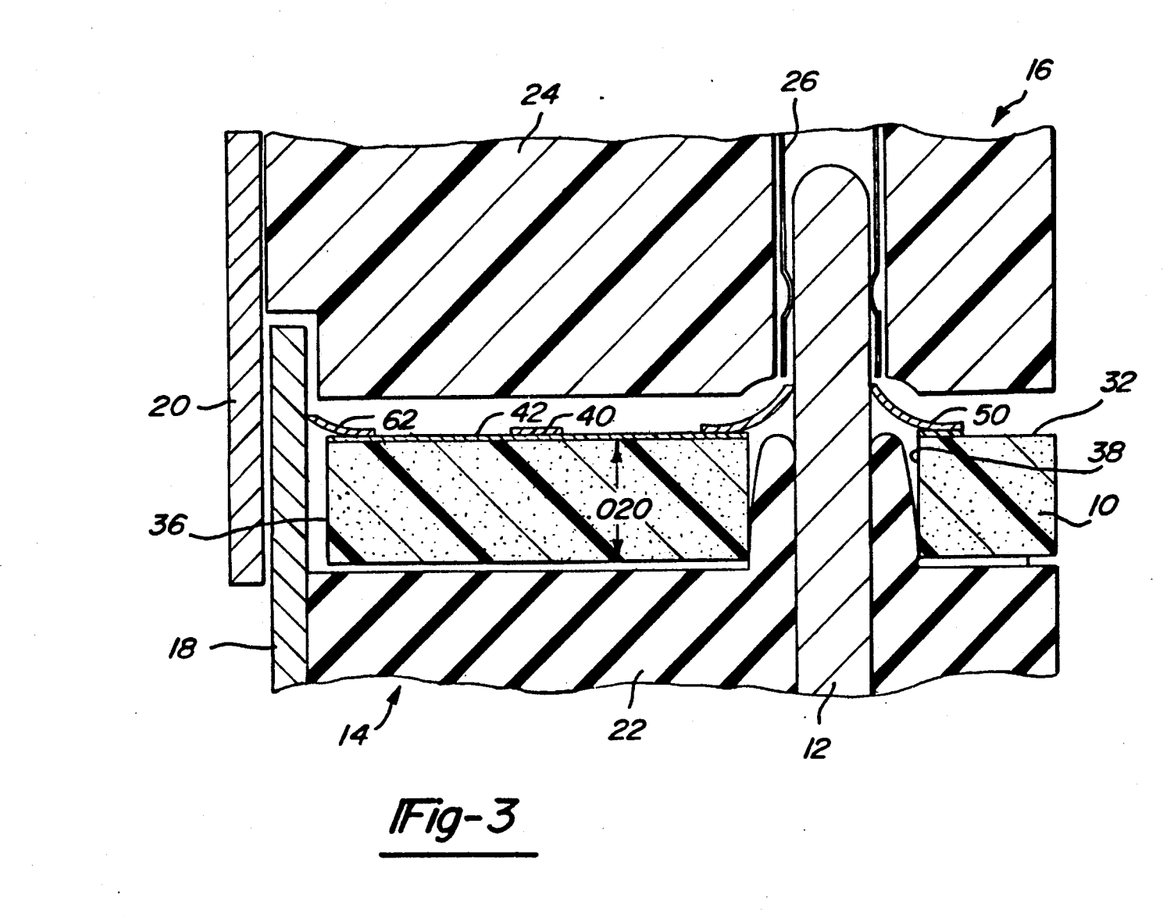
FIG. 3 is a partial cross-sectional view illustrating another embodiment and one technique for making electrical contact between the pins and the wafer.

In most applications it is necessary to make electrical connection to the innermost shell of the connector pair which often serves as an electrical ground. In such instances similar wiping electrically conductive fingers 62 can be used for this purpose, as seen in FIG. 3.

Figure 2:
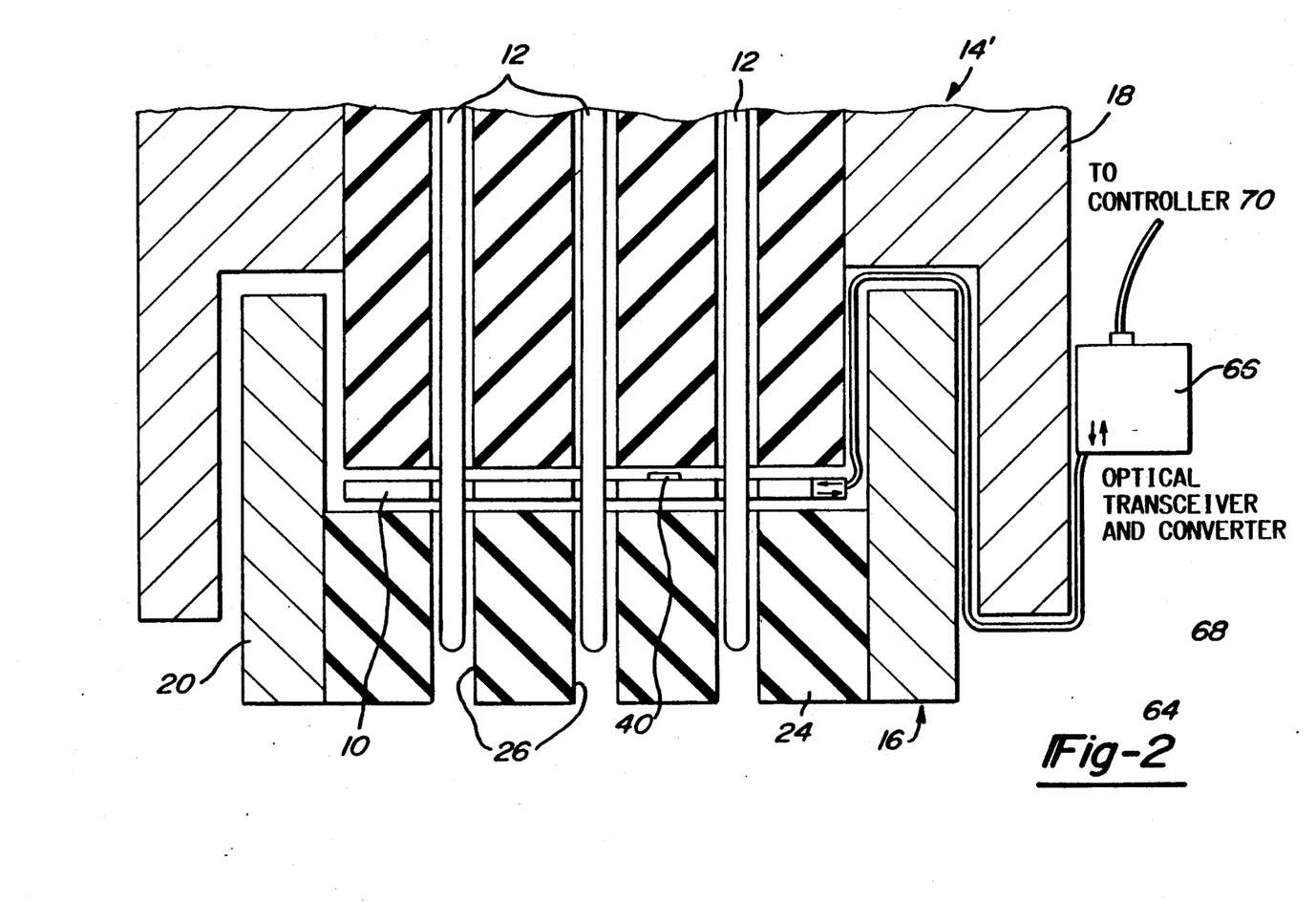
FIG. 2 is a cross-sectional view of one embodiment of the invention in which the wafer is sandwiched between mated male and female connectors.

FIG. 2 illustrates a somewhat more sophisticated embodiment where bidirectional communication is made between the circuitry 40 on the wafer 10. In such manner, it is possible to expand the capabilities of the invention. As shown in FIG. 2, the wafer includes a suitable onboard optical transceiver 64 which communicates with a remote transceiver and converter 66 via a light waveguide 68. Transceiver and converter 66 is coupled to a suitable controller 70 which may be provided by way of a host computer. Electrical signals from the controller 70 are converted by transceiver/converter 66 into suitable light pulses which are transmitted by waveguide 68 to the transceiver 64 on wafer 10. The waveguide 68 can be made of suitable material that has sufficient flexibility and integrity to transmit the optical information in a reliable manner. It should be flexible enough so that it can conform with the relatively small pathways left between shells 20 and 18 of the mated connectors, as shown. Waveguide 68 can, for example, take the form of a Mylar strip which is preferably coated with a reflecting substance on its outer surfaces to increase the efficiency of the optical transmission.

Figure 8:
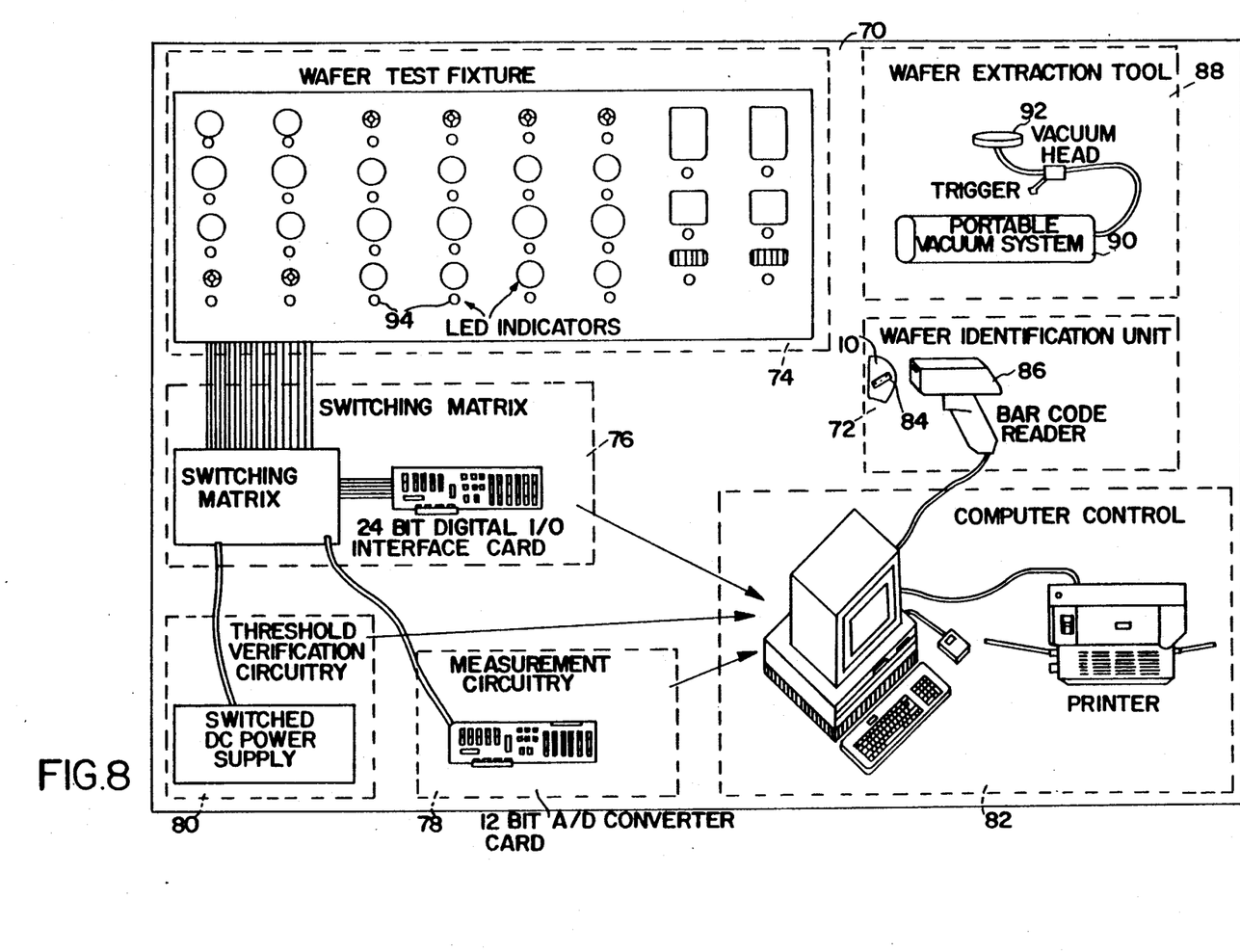
FIG. 8 is a block diagram view of a system which may be used to test the wafers.

Optical transceiver 64 converts the optical signal from waveguide 68 into suitable electrical signals which are fed to the circuitry 40 on the wafer 10. For example, the signals could be used to program a suitable integrated circuit microprocessor which serves as the circuitry 40. The microprocessor then could communicate with the electronic equipment 28 via the pins 12 in the male connector 14 (FIG. 1). Likewise, signals from the electronic equipment 28 can be communicated to the remote controller 70 via the pins 12, circuitry 40, optical transceiver 64, waveguide 68 and optical transceiver/converter 66. A system of this type can be used for a variety of applications such as advanced signal processing, intelligent instrumentation, real-time data stream monitoring, remotely controlled signal conditioning, switching and processing; remotely controlled interface diagnostics, transient data recordation and the like. Again, these applications are by way of non-limiting examples. Depending upon the application and type of circuitry on the wafer 10, it may be desirable to remove the wafer and test the circuitry thereon. For example, if the circuitry takes the form of the fuses shown in FIGS. 6 and 7, it would be desirable to periodically remove and test the wafer to determine if any of the fuses 40(a, b, c) had melted due to high levels of electromagnetic induced current pulses on the pins 12. FIG. 8 illustrates a suitable test console 70 for this purpose. Console 70 includes a wafer identification unit 72, a wafer test fixture 74, a switching matrix 76, measurement circuitry 78, threshold verification circuitry 80 and computer control 82. The identification unit 72 uniquely identifies a wafer 10 by means of an identification tag 84 on each wafer 10. Tag 84, in this example, is a conventional bar code which can be read by a suitable bar code reader 86.

A wafer extraction tool 88 aids in the insertion and removal of the wafer into the connector 14 and minimizes the risk of wafer damage due to mechanical stress or other events. Tool 88 employs a vacuum system 90 with a vacuum head 92 designed to temporarily hold the wafer 10. During insertion, the head 92 manipulates the wafer so that the pins slide into the wafer holes 38 and make electrical connection to the pin contacts 50 and the shell contacts 62 make connection to the shell 18 (FIG. 3). The male and female connectors 14 and 16 are then mated together in the usual manner with the pins 12 being inserted into the female sockets 26. As illustrated in the drawings, the wafer 10 is sufficiently thin that it does not disturb the normal mating of the connectors. To remove the wafer 10, the connectors are disassembled and the vacuum tool 88 is used to extract the wafer 10 from the male connector 14.

The wafers then are placed in the test fixture 74 which generally consists of a bank of the same MIL-SPEC connectors 14. The test fixture 74 is capable of testing one wafer at a time by placing the wafer in its corresponding connector. An LED indicator 94 automatically locates the proper connector to use based on the wafer's identification code. The switching matrix 76 switches the resistance measurement between any pin on the connector and another pin or the connector shell. It also switches in an onboard switched DC power supply to verify the threshold of any of the fuses 40(a, b or c). The switching matrix 76 is controlled by the computer 82 through a bus interface card. The measurement circuitry 78 makes a resistance measurement that determines which fuses 40(a, b or c), if any, have been blown. An A/D converter with a fast sampling rate is used so that many fuses can be tested in a small amount of time. The threshold verification circuitry 80 includes a programmable switch DC power supply and a source resistant network. It creates a known square pulse with enough amplitude to blow any of the fuses. The pulse level is stepped up slowly and the fuse resistance is read after each pulse to determine when the fuse blows and what its threshold was. Computer control 82 controls all of the systems and records the data from the test. The computer is suitably programmed so that it will control all the testing procedure.

From the foregoing, those skilled in the art should realize that the present invention provides a simple, yet reliable way to rapidly and unintrusively make electrical connection to pins in electrical connectors and which further enables the user to modify or add a wide variety of functions through the use of the appropriate circuitry on the wafer. As noted from the outset, the invention has been described in connection with a few particular examples. However, Various modifications and other applications will become apparent to the skilled practitioner after having the benefit of studying the specification, drawings and following claims.

What is claimed is:

1. A device for making electrical connection to a plurality of pins in a male cable connector which mates with sockets in a female connector, the male and female connectors having outer shells which are removably connected together, said device comprising:
   a wafer having a series of holes therein aligned with the pins in the male connector, the wafer having a diameter smaller than the diameter of the male connector shell, said wafer being insertable into the male cable connector shell so that the pins extend through the holes;
   circuit means on the wafer for using electrical signals on the pins; and
   contact means for making electrical contact between the pins as they extend through the holes in the wafer and the circuit means.

2. The device of claim 1 wherein the device further comprises:
   second contact means for making removable electrical connection between the wafer and one of the shells.

3. The device of claim 1 wherein said contact means comprises:
   metallic discs each having a plurality of inwardly extending bendable fingers terminating at an aperture in the disc, outer rim portions of each disc being connected to the wafer so that the apertures in the disc aligns with a hole in the wafer, and wherein the pins extend through the apertures and the bendable fingers make electrical connection between the pins and the wafer.

4. The device of claim 1 wherein said wafer is made of semiconductor material.

5. The device of claim 4 wherein said circuit means comprises an integrated circuit formed in the semiconductor wafer.

6. The device of claim 4 wherein said circuit means comprises:
   means on the semiconductor wafer for defining at least one fuse coupled to the contact means, with the fuse melting when a signal on a pin exceeds a preselected level.

7. The device of claim 1 which further comprises:
   communication means for receiving and transmitting information between the circuit means on the wafer and a remote controller.

8. The device of claim 7 wherein the communication means comprises:
   optical transceiver means on the wafer;
   remote optical transceiver means spaced from the connectors; and
   light waveguide means for transmitting optical signals between the transceiver on the wafer and the remote transceiver.

9. The device of claim 8 wherein the light waveguide means comprises:
   a flexible strip extending between shells of the male and female connectors, one end of the strip being connected to the transceiver on the wafer, and another end of the strip being connected to the remote transceiver.

10. The combination comprising:
    a male electrical connector having an outer metallic shell and a plurality of electrically conductive pins carrying electrical signals to electronic equipment;
    a female connector having an outer metallic shell and a plurality of sockets for receiving the pins in the male connector; and
    a semiconductor wafer lying between the male and female connectors, the wafer having a sufficiently small diameter and being sufficiently thin to permit the male and female connectors to be mated together to permit the pins to engage the sockets, the wafer including contact means for making removable electrical connection between the pins and the wafer to thereby permit the wafer to be inserted and removed from the interior of the shell of the male connector; and circuit means on the wafer for electrically communicating through the contact means with the pins on the male connector;
    whereby the wafer provides simple electrical connection to the pins and to the electronic equipment coupled thereto.

11. The combination of claim 10 wherein said circuit means comprises an integrated circuit formed on the semiconductor wafer.

12. The combination of claim 10 wherein said circuit means comprises:
    means on the semiconductor wafer for defining at least one fuse coupled to the contact means, with the fuse melting when a signal on the pin exceeds a preselected level.

13. The combination of claim 10 which further comprises:
    second contact means for making removable electrical connection between the wafer and one of the shells.

14. The combination of claim 10 wherein said contact means comprises:
    metallic discs each having a plurality of inwardly extending bendable finger terminating at an aperture in the disc, outer peripheral portions of each disc being connected to the wafer so that the aperture in the disc aligns with a hole in the wafer, and wherein the pin extends through the apertures and the bendable fingers make electrical connection between the pins and the wafer.

15. The combination of claim 10 which further comprises:
    bidirectional communication means for receiving and transmitting information between the circuit means on the wafer and a remote controller.

16. The combination of claim 15 wherein the bidirectional communication means comprises:
    optical transceiver means on the wafer;
    remote optical transceiver means spaced from the connectors; and
    light waveguide means for transmitting optical signals between the transceiver on the wafer and the remote transceiver.

17. The combination of claim 16 wherein the light waveguide means comprises:
    a flexible strip extending between the shells of the male and female connectors, one end of the strip being connected to the transceiver on the wafer, and another end of the strip being connected to the remote transceiver.

18. A method of making electrical connection to electronic equipment that is removably connected to an electrical cable by mating male and female connectors, the male connector having a plurality of pins extending into sockets in the female connector, said method comprising:
    providing a wafer having a series of holes therein corresponding to the pins in the male connector;
    inserting the wafer into the male connector so that the pins extend through the holes in the wafer;
    making a wiping electrical contact between the pins and the wafer;
    mating the male and female connectors together while sandwiching the wafer therebetween; and
    using circuitry on the wafer to perform preselected functions on signals carried by the pins.

19. The method of claim 18 wherein the method further comprises:
    bidirectionally communicating between the electronic equipment and a remote controller through the wafer and its contacts with the pins.

20. The method of claim 18 which further comprises:
    unmating the male and female connectors;
    removing the wafer from the male connector; and
    measuring characteristics of the circuitry on the wafer.

21. A device for making electrical connection to a plurality of pins in a male connector which mates with sockets in a female receptacle, said device comprising:
    a wafer having a series of holes therein aligned with the pins in the male connector, said wafer being insertable onto the male connector so that the pins extend through the holes;
    circuit means on the wafer for detecting electrical signals on the pins;
    contact means for making electrical contact between the pins as they extend through the holes in the wafer and the circuit means; and
    said wafer being sufficiently thin to allow the male connector to mate with the female receptacle and permit the circuit means to detect electrical signals flowing between the female sockets and male connector pins.

22. The device of claim 21 wherein the male connector includes a metallic shell, and wherein the device further comprises:
    second contact means for making removable electrical connection between the wafer and the shell.

23. The device of claim 21 wherein said contact means comprises:
    metallic discs each having a plurality of inwardly extending bendable fingers terminating at an aperture in the disc, outer rim portions of each disc being connected to the wafer so that the apertures in the disc aligns with a hole in the wafer, and wherein the pins extend through the apertures and the bendable fingers make electrical connection between the pins and the wafer.

24. The device of claim 21 wherein said circuit means comprises means for detecting characteristics of the power of the electrical signals flowing between the female receptacle and the male connector.

25. The device of claim 21 wherein said wafer is made of semiconductor material.

26. The device of claim 25 wherein said circuit means comprises an integrated circuit formed in the semiconductor wafer.

27. The device of claim 25 wherein said circuit means comprises:
    means on the semiconductor wafer for defining at least one fuse coupled to the contact means, with the fuse melting when a signal on a pin exceeds a preselected level.

28. The device of claim 21 which further comprises:
    communication means for transmitting information from the circuit means on the wafer to a remote controller.

29. The device of claim 28 wherein the communication means comprises:
    optical transmitter means on the wafer;
    remote optical receiver means spaced from the wafer; and
    light waveguide means for transmitting optical signals from the transmitter on the wafer to the remote receiver.

30. The device of claim 29 wherein the male connector is a cable connector having an outer shell and wherein the female receptacle comprises a female cable connector with an outer shell that is removably connected to the shell of the male connector.

31. The device of claim 30 wherein the light waveguide means comprises:
    a flexible strip extending between the shells of the male and female connectors, one end of the strip being connected to the transmitter on the wafer, and another end of the strip being connected to the remote receiver.

32. A method of detecting characteristics of electrical signals flowing between a male connector that is removably connected to a female receptacle, the male connector having a plurality of pins extending into sockets in the female receptacle, said method comprising:

providing a wafer having a series of holes therein corresponding to the pins in the male connector;

inserting the wafer into the male connector so that the pins extend through the holes in the wafer;

making electrical contact between the pins and circuitry on the wafer;

mating the male connector and the female receptacle, with the wafer being sandwiched therebetween; and using the circuitry on the wafer to perform preselected functions on signals carried by the pins.

33. The method of claim 32 which further comprises: unmating the male connector and female receptacle; removing the wafer from the male connector; and detecting characteristics of the circuitry on the wafer.

34. The method of claim 33 wherein said circuitry senses power flowing between the female receptacle and male connector, and wherein said detecting step tests for characteristics of power as sensed by the circuitry.

* * * * *